(12) United States Patent
Healy

(10) Patent No.: US 9,937,819 B2
(45) Date of Patent: Apr. 10, 2018

(54) MOTOR VEHICLE ACCESSORY TO INCREASE POWER SUPPLY AND REDUCE FUEL REQUIREMENTS

(71) Applicant: Hyliion Inc., Pittsburgh, PA (US)

(72) Inventor: Thomas Joseph Healy, South Easton, MA (US)

(73) Assignee: Hyliion Inc., Pittsburgh, PA (US)

( * ) Notice: Subject to any disclaimer, the term of this patent is extended or adjusted under 35 U.S.C. 154(b) by 0 days.

(21) Appl. No.: 15/144,775

(22) Filed: May 2, 2016

(65) Prior Publication Data

US 2016/0318421 A1    Nov. 3, 2016

Related U.S. Application Data

(60) Provisional application No. 62/179,209, filed on May 1, 2015.

(51) Int. Cl.
*B60L 15/00* (2006.01)
*B60L 15/20* (2006.01)
(Continued)

(52) U.S. Cl.
CPC ........ *B60L 15/2045* (2013.01); *B60K 17/356* (2013.01); *B60L 1/02* (2013.01); *B60L 7/10* (2013.01); *B60L 7/18* (2013.01); *B60L 8/003* (2013.01); *B60L 11/1801* (2013.01); *B60L 11/1809* (2013.01); *B60L 11/1851* (2013.01); *B60L 15/2009* (2013.01); *B60L 15/2018* (2013.01); *B62D 59/04* (2013.01); *B62D 63/08* (2013.01); *B60K 1/00* (2013.01); *B60K 2001/001* (2013.01); *B60L 2200/28* (2013.01); *B60L 2240/10* (2013.01); *B60L 2240/423* (2013.01); *B60L 2240/642* (2013.01); *B60L 2260/24* (2013.01); *B60Y 2200/148* (2013.01); *B60Y 2200/91* (2013.01); *B60Y 2300/181* (2013.01);
(Continued)

(58) Field of Classification Search
CPC combination set(s) only.
See application file for complete search history.

(56) References Cited

U.S. PATENT DOCUMENTS 6,516,925 B1 * 2/2003 Napier ...................... B60T 1/10
188/112 A
7,147,070 B2 * 12/2006 Leclerc ..................... B60K 1/00
180/14.2
(Continued)

OTHER PUBLICATIONS

PCT International Search Report and Written Opinion, Application No. PCT/US2016/030482, dated Aug. 4, 2016.
(Continued)

*Primary Examiner* — Jonathan L Sample
(74) *Attorney, Agent, or Firm* — Haynes and Boone, LLP

(57) ABSTRACT

A power control system may include at least one of batteries, a motor, and a data logic analyzer that can interpret certain variable conditions of a transport, such as a tractor trailer, moving along a road or highway. The data can be used to determine when to apply supplemental power to the wheels of a trailer to reduce fuel usage. One example device may include at least one of a power source affixed to a trailer to capture energy from movement of an axle of the trailer, and a motor powered by the power source to operate and provide movement assistance to the axle.

10 Claims, 5 Drawing Sheets

(51) Int. Cl.
*B60L 7/18* (2006.01)
*B60L 8/00* (2006.01)
*B60L 11/18* (2006.01)
*B60L 1/02* (2006.01)
*B60L 7/10* (2006.01)
*B62D 59/04* (2006.01)
*B62D 63/08* (2006.01)
*B60K 17/356* (2006.01)
*B60K 1/00* (2006.01)

(52) U.S. Cl.
CPC ............. *B60Y 2300/182* (2013.01); *B60Y 2300/18125* (2013.01); *B60Y 2300/52* (2013.01); *B60Y 2300/60* (2013.01); *B60Y 2400/216* (2013.01); *B60Y 2400/301* (2013.01); *B60Y 2400/304* (2013.01); *B60Y 2400/61* (2013.01); *Y02T 10/645* (2013.01); *Y02T 10/7005* (2013.01); *Y02T 10/705* (2013.01); *Y02T 10/7072* (2013.01); *Y02T 10/7083* (2013.01); *Y02T 10/7283* (2013.01); *Y02T 10/7291* (2013.01); *Y02T 90/14* (2013.01); *Y02T 90/16* (2013.01)

(56) References Cited

U.S. PATENT DOCUMENTS

| | | | | |
|---|---|---|---|---|
| 7,338,335 | B1* | 3/2008 | Messano | B60G 13/14 180/65.22 |
| 8,327,960 | B2* | 12/2012 | Couture | B25J 5/005 180/9.1 |
| 2002/0038730 | A1* | 4/2002 | Bidwell | B62M 7/16 180/15 |
| 2004/0002794 | A1* | 1/2004 | Pillar | A62C 27/00 701/1 |
| 2005/0045058 | A1* | 3/2005 | Donnelly | B60L 3/0046 105/26.05 |
| 2005/0060079 | A1* | 3/2005 | Phillips | B60K 5/08 701/53 |
| 2007/0193795 | A1* | 8/2007 | Forsyth | B60K 1/00 180/65.285 |
| 2008/0023234 | A1* | 1/2008 | Wang | B62D 59/04 180/14.2 |
| 2008/0169144 | A1* | 7/2008 | DeGrave | B60L 7/08 180/165 |
| 2008/0174174 | A1* | 7/2008 | Burns | B60W 10/08 303/152 |
| 2009/0223725 | A1* | 9/2009 | Rodriguez | B60K 6/40 180/65.21 |
| 2010/0282122 | A1* | 11/2010 | Mai | B60L 7/10 105/1.4 |
| 2011/0042154 | A1* | 2/2011 | Bartel | B60L 7/10 180/11 |
| 2011/0094807 | A1* | 4/2011 | Pruitt | B60K 1/04 180/65.6 |
| 2011/0320078 | A1* | 12/2011 | McGill | B60K 6/48 701/22 |
| 2012/0167555 | A1* | 7/2012 | Frazier | B60W 10/06 60/274 |
| 2013/0190998 | A1* | 7/2013 | Polimeno | B60W 10/02 701/68 |
| 2013/0204501 | A1* | 8/2013 | Keeney | B60T 1/10 701/70 |
| 2013/0338848 | A1* | 12/2013 | Park | G01C 9/06 701/1 |
| 2014/0025245 | A1* | 1/2014 | Fanourakis | B62D 53/08 701/22 |
| 2015/0298680 | A1* | 10/2015 | Matthews | B60W 20/00 701/22 |
| 2015/0298684 | A1* | 10/2015 | Schwartz | B60W 10/10 701/22 |
| 2016/0014252 | A1* | 1/2016 | Biderman | B60L 15/20 455/420 |
| 2016/0031435 | A1* | 2/2016 | Gibson | B60W 10/02 477/5 |
| 2016/0061611 | A1* | 3/2016 | Meyer | G01C 21/3469 701/1 |
| 2016/0137204 | A1* | 5/2016 | Morselli | B60T 8/175 701/54 |
| 2016/0318421 | A1* | 11/2016 | Healy | B60L 15/2045 |

OTHER PUBLICATIONS

Karbowski, Sokolov, and Rousseau, "Vehicle Energy Management Optimisation through Digital Maps and Connectivity", 22nd ITS World Congress, ITS-1952, Bordeaux, France, Oct. 5-9, 2015.

Lin, Kang, Grizzle, and Peng, "Energy Management Strategy for a Parallel Hybrid Electric Truck", Proceedings of the American Control Conference, 2001, pp. 2878-2883, Digital Object Identifier: 10.1109/ACC.2001.946337.

Zulkifli, Mohd, Saad, and Aziz, "Operation and Control of Split-Parallel, Through-The-Road Hybrid Electric Vehicle With In-Wheel Motors", International Journal of Automotive and Mechanical Engineering, vol. 11, pp. 2793-2808, 2015, Digital Object Identifier: 10.15282/ijame.11.2015.54.0235.

Kural and Guvenc, "Predictive-Equivalent Consumption Minimization Strategy for Energy Management of a Parallel Hybrid Vehicle for Optimal Recuperation", Journal of Polytechnic, 18(3), pp. 113-124, 2015, Digital Object Identifier: 10.2339/2015.18.3, 113-124.

Skugor, Pavkovic, and Deur, "A Series-Parallel Hybrid Electric Vehicle Control Strategy Including Instantaneous Optimization of Equivalent Fuel Consumption", IEEE International Conference on Control Applications, pp. 310-316, 2012.

Musardo, Rizzoni, and Staccia, "A-ECMS: An Adaptive Algorithm for Hybrid Electric Vehicle Energy Management", Proceedings of the 44th IEEE Conference on Decision and Control, 2005, pp. 1816-1823.

Paganelli, Delprat, Guerra, Rimaux, and Santin, "Equivalent Consumption Minimization Strategy for Parallel Hybrid Powertrains", Proceedings of the IEEE 55th Vehicular Technology Conference, 2002, pp. 2076-2081.

Sciarretta, Back, and Guzzella, "Optimal Control of Parallel Hybrid Electric Vehicles", IEEE Transactions on Control Systems Technology, vol. 12, No. 3, pp. 352-363, May 2004.

Sciarretta and Guzzella, "Control of Hybrid Electric Vehicles", IEEE Control Systems Magazine, vol. 27, No. 2, pp. 60-70, Apr. 2007.

* cited by examiner

MOTOR VEHICLE ACCESSORY TO INCREASE POWER SUPPLY AND REDUCE FUEL REQUIREMENTS

CROSS-REFERENCE TO RELATED APPLICATIONS

This application claims priority to earlier filed U.S. provisional patent application No. 62/179,209 filed on May 1, 2015 and entitled "Electric tractor trailing sliding suspension system", the entire contents of which are incorporated herein by reference.

TECHNICAL FIELD OF THE APPLICATION

This application relates to optimal motor vehicle power and more particularly to offsetting fuel consumption via intelligent control and distribution of electronic power assistance.

BACKGROUND OF THE APPLICATION

Conventionally, Fuel accounts for nearly 40% of operating costs in the trucking industry. For trucking fleets that face large costs associated with diesel gasoline, any way to off-set those costs would be worth considering. A product for the automotive and/or trucking industry that reduces fuel consumption and optimizes an energy footprint would be highly acclaimed. There are presently sliding axle/suspension systems that bolt on under a trailer, but conventionally they are a passive system and thus no power is typically applied to the wheels.

SUMMARY OF THE APPLICATION

One example embodiment of the present application may provide a device that identifies vehicle movement information and applies electronic motor support to the trailer based on the trailer movement information.

Another example embodiment of the present application may include an apparatus comprising at least one of: a power creation module configured to generate electrical power, a battery configured to store the electrical power, a motor affixed to an axle of a trailer and/or truck and configured to provide a turning force to the axle when enabled to operate from the stored electrical power of the battery, and a motor controller configured to initiate the motor to operate according to a predefined sensor condition.

Yet another example embodiment of the present application may include an apparatus comprising at least one of: a battery configured to store electrical power generated from movement of a trailer, a motor affixed to a vehicle axle of a trailer and/or truck and configured to provide a turning force to the trailer axle when enabled to operate from the stored electrical power of the battery, and a motor controller configured to initiate the motor to operate according to a predefined sensor condition.

Still yet another example embodiment of the present application may include an apparatus comprising at least one of: at least one sensor affixed to a vehicle (or to a trailer coupled to the vehicle) configured to receive sensor data during movement of the vehicle, a motor affixed to a vehicle axle of the vehicle configured to provide a turning force to the vehicle axle when enabled to operate from battery power, a vehicle controller configured to identify a threshold sensor condition has been triggered based on the sensor data received from the at least one sensor, and a motor controller configured to initiate the motor to operate according to the threshold sensor condition.

Yet still another example embodiment of the present application may include an apparatus comprising at least one of: at least one sensor affixed to a vehicle (or to a trailer coupled to the vehicle) configured to receive sensor data during movement of the vehicle, a motor affixed to a vehicle axle of the vehicle configured to provide a turning force to the vehicle axle when enabled to operate from battery power, and a vehicle controller configured to identify a threshold sensor condition has been triggered based on the sensor data received from the at least one sensor and control a speed of the vehicle based on the threshold sensor condition.

Still yet a further example embodiment may include an apparatus including at least one of a power source affixed to a trailer configured to capture energy from movement of an axle of the trailer, and a motor powered by the power source and configured to operate and provide movement assistance to the axle.

Still yet a further example embodiment may include an apparatus that includes a power source affixed to a trailer configured to charge a battery from movement of an axle of the trailer, and a motor powered by the battery and configured to operate and provide movement assistance to the axle.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
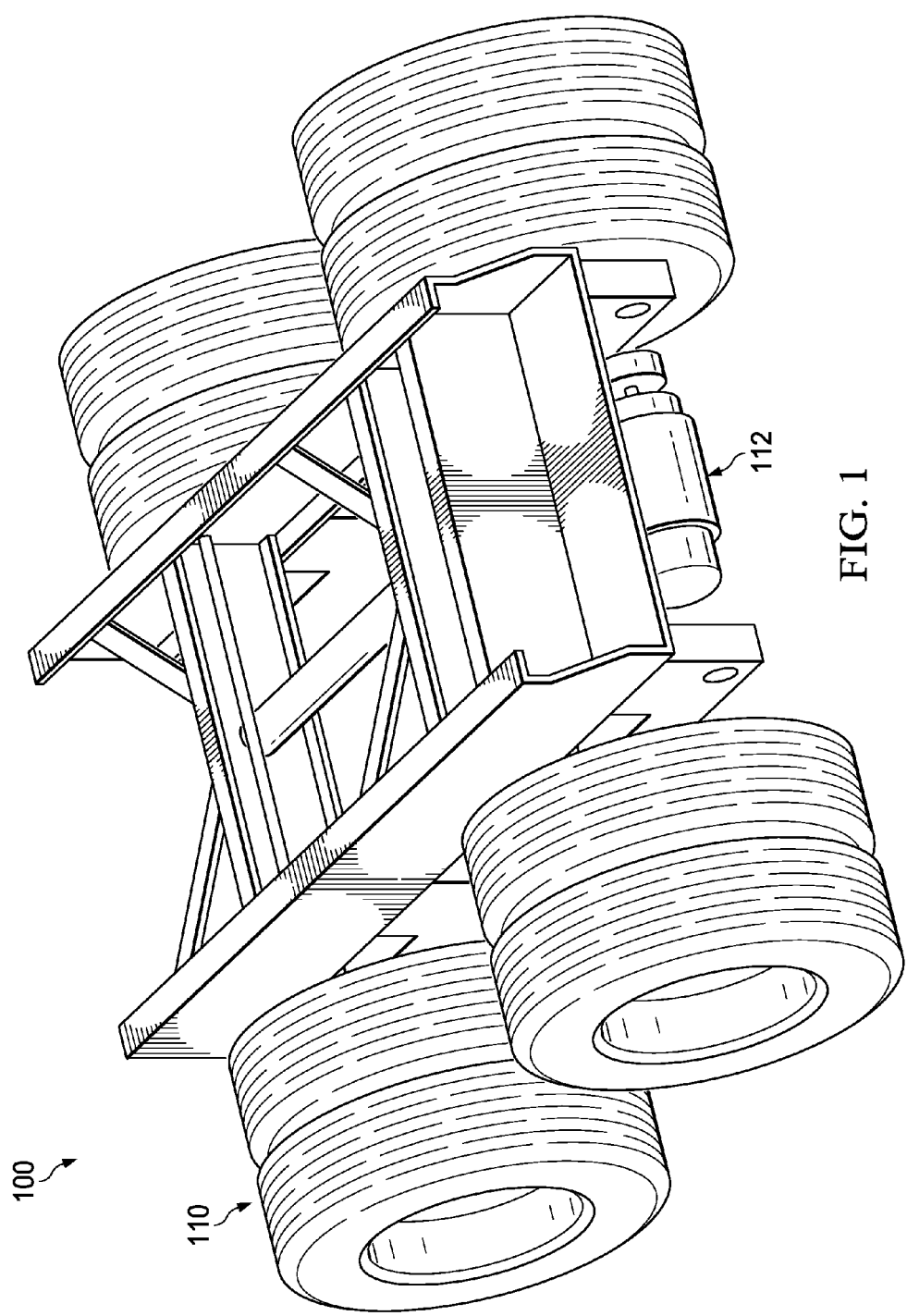
FIG. 1 illustrates a top view perspective of the trailer axle and suspension assembly with the electronic motor assistant according to example embodiments.

FIG. 1 illustrates a top view perspective of the truck axle and wheel assembly with the electronic motor assistant according to example embodiments. Referring to FIG. 1, the top view of the trailer wheel and axle assembly 100 includes a set of tires and corresponding wheels 110, a frame and an electronic motor 112 affixed to the underside of the frame. The electric power source is bolted under the trailer and integrated into a suspension configuration. The integrated motor configuration may include batteries affixed to the underside of the frame. The integrated motor configuration will capture energy from the axle which is stored in the battery array 116 of FIG. 2. The stored battery energy can then be used to activate the motor and provide movement assistance to the drive axle via the motor extension 114 which transfers the movement from the motor to the axle. In general there are two additional components, one is the electric motor controller which manages the energy between the motor and the batteries. The second component is the automated control system which has sensors and can predict when and where to apply power or capture it.

There may be one motor per wheel. There may only be one motor for the whole axle in an alternative embodiment. Or there may be a motor on either axle. Or four motors in each wheel. Some trailers have one or more axles and any number of axles can be accommodated. The axles can either be fixed or on a sliding suspension platform. The distributed power source can then apply power to each of the motors at the same time or independently from one another. Energy may be captured through an electric motor and drive axle and then stored in a battery pack. Also, a hydraulic system where energy is captured via air pressure, fluid pressure, flywheel, solar panels on the vehicle and/or a combination of one or more of those power sources. The energy can then be transferred back into the electric motor to power the suspension and axle system forward. Control features, such as an accelerometer and gyroscope in the control system on the suspension may independently sense when acceleration or braking is occurring and apply power/torque (in the positive or negative direction) or not apply power/torque in such instances. The control system will also sense what the driver is doing and operate the system appropriately.

In another example embodiment, a brake line under the truck can be used to determine braking and power for redundancy. Also, data from the truck data port can communicate with the control system on the trailer to make decisions based on the vehicle data (e.g., speed, braking, acceleration, movement, etc.). The system may have a drive axle that is connected to an electric motor. This enables both the axle to spin the motor as well as the motor to spin the axle. This permits for a transfer of energy between the two components. The electric motor is connected to a control system. This control system can send electricity in different frequencies to the motor in order to power it at different speeds. The control system can also send electricity to the electric motor that will permit for the drive axle to spin the motor that will then produce energy. This produced energy will then be sent back to the control system. The control system is attached to a battery pack.

The control system also monitors battery levels and parameters within the system, a motor controller and battery management system monitors the levels and reads the electricity flow through the shunt or current through a high voltage line and calculates the amperage and thus battery level. The vehicle control unit and control system is able to sense the driver's actions and control the motor controller, the battery pack and the electric motor appropriately. It is also able to use elevation graphs in order to properly control the system. Elevation information from a graph, gyroscope can be used to identify a grade and location to determine elevation. An elevation parameter may also be used as a basis as to whether to apply power or not apply power. The control system can predict where the vehicle is headed towards and assess the terrain ahead. The system can then determine whether to discharge or charge the batteries now in order to be most efficient when the vehicle reaches the terrain ahead. Also, a scale system on the trailer may provide information about weight and needed power (air suspension).

Figure 2:
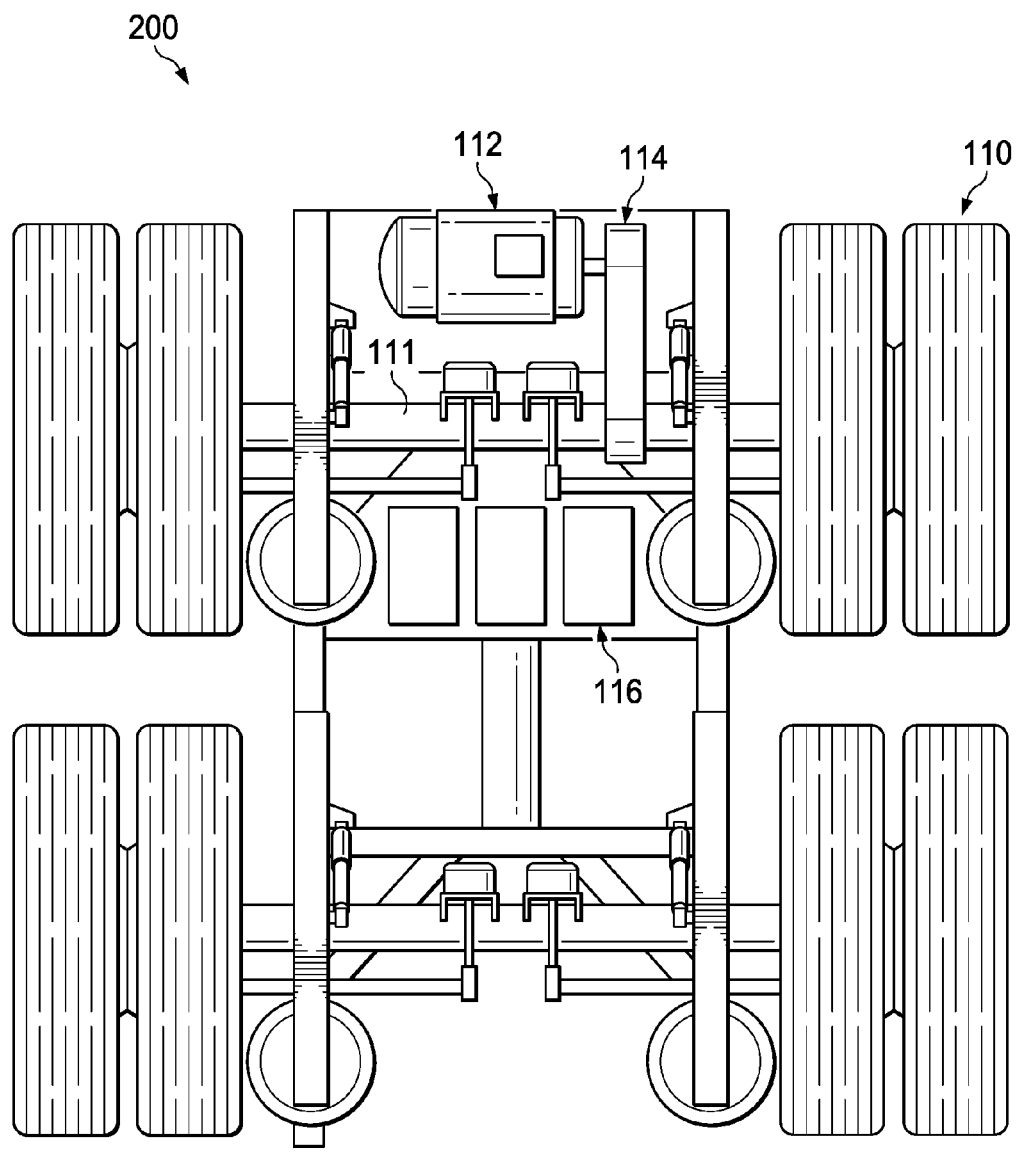
FIG. 2 illustrates a under body view perspective of the trailer axle and suspension assembly with the electronic motor assistant according to example embodiments.

FIG. 2 illustrates a under body view perspective of the trailer axle and suspension assembly with the electronic motor assistant according to example embodiments. Referring to FIG. 2, the electric motor may have a belt driven connection 114 to the drive axle, however, a chain driven, parallel gear drive, gearbox, a direct drive with a pinion pinion/gear/differential connection, fluid torque transfer, flexible coupling, direct drive with a motor inside the axle, an electric motor could be directly connected to the hub, or a transmission which can be continuously variable to use different gears while the system is operating. Also, the battery packs may be tucked into the green frame where they are encapsulated for safety purposes. Instead, a snap-in and snap-out battery module may be detachably attached.

In operation, when the truck is stopped, the control system and alternate power supply (120 volt AC, 240 volt AC, or other varying voltages) can be plugged-in to the truck to power the appliances, heating and cooling instead of running the diesel motor throughout the night. The system can also power cameras in case of accidents or incidents, power sensors to warn about tire pressure, etc., GPS systems, etc. The system may also connect to the cloud for data storage, analytics, etc. Additionally, the design may be more aerodynamic so that the air flowing under the trailer is more of an air foil to make the undercarriage more aerodynamic, thus reducing the drag coefficient.

According to example embodiments energy is created via movement of the vehicle in more than one way. The energy is stored in batteries. When certain variables are within a predefined range (i.e. OBDII or J1939 CanBus data from the truck is observed at threshold conditions, MPH, acceleration rate, braking, gyroscope movement, a particular gear being used, inclinometer, GPS coordinates, terrain graphs etc.), then the smart system knows to engage the electrical energy which adds to the performance of the axle being able to be turned or to a suspension being shifted to increase efficiency. The energy (batteries/electric motor) will add to the performance of the axle being turned, the electronic control module (ECM) which conventionally operates on CanBus and specifically J1939 in modern trucks, is what trucks have instead of OBDII ports as identified in cars, however, for purposes of this disclosure both interfaces may be part of the overall system.

Figure 3:
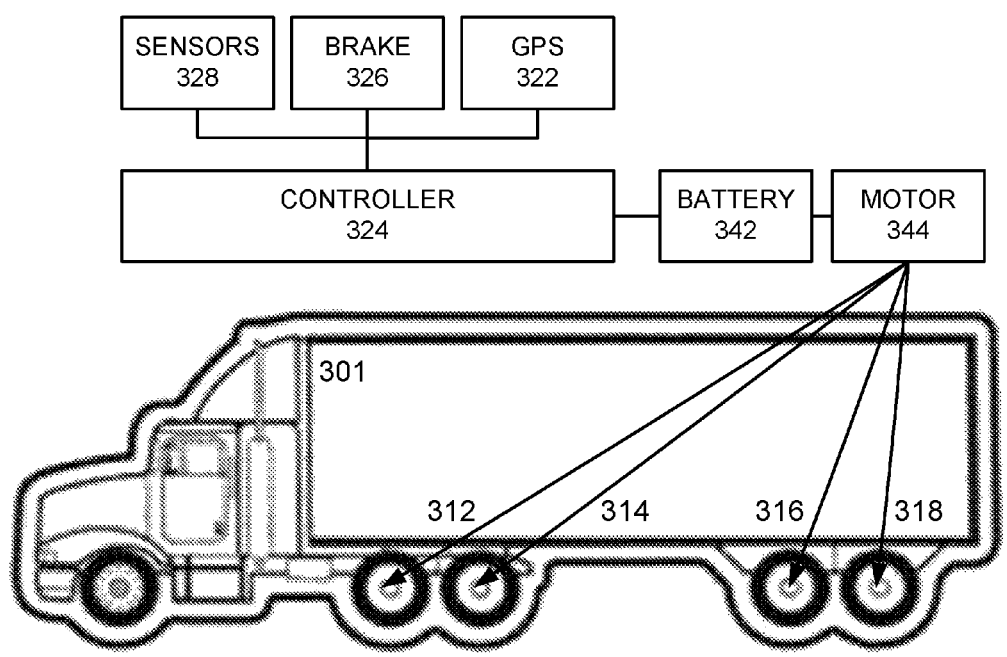
FIG. 3 illustrates an example system configuration of the electronic motor support for the trailer and/or truck according to example embodiments.

FIG. 3 illustrates an example system configuration of the electronic motor support for the truck according to example embodiments. Referring to FIG. 3, the 'energy' is provided from the axle/suspension system and the axle itself (i.e., captured energy from movement). The system configuration 300 includes a truck 301 which houses one or more motors 344, batteries 342, and other localized adaptation units configured to receive commands from the controller 324 and provide or not provide assisted energy to the various axles 312, 314 of the truck and or 316 and 318 of the trailer. The spinning of the axle itself may create energy in the present example, by turning the same motor used to power the axle and generating electrical power which is stored in the battery 342. Any data from the sensors 328, the braking performed by the truck brakes and/or other data sources, such as network data from trucking networks, GPS signals, terrain information, weather information, etc., may also be used to enable the controller 324 to enable the one or more motors 344 to provide assistance to the axles. In one example, the sensory data may be identified (i.e., miles per hour) as providing an enabling signal to one motor for one axle 312 while the other axles and their respective motors are not enabled. In the event that additional sensory data, such as a secondary condition (i.e., inclined road, audio from engine RPM, etc.) may enable additional motors to offer assistance to the other axles 314, 316 and/or 318. One skilled in the art would appreciate that one or more sensory conditions may enable one, two, or more of the motors to begin operating and offering assistance to the truck to save energy and increase fuel economy.

Also in other embodiments, the shocks moving up and down could also create energy that is stored in the batteries via a suspension electrical power capturing adaptation module (not shown). Other examples of power sources may include movement of the primary engine of the truck, solar panels, a charge system that plugs into power outlets. An example of this would be outlets at rest stops, loading docks, weigh stations etc. The control aspect of the controller 324 may include a microcontroller and/or processor. The controller would use logic to interpret OBDII/ECM digital data reading capabilities and interpretation to arrive at certain commands such as: do nothing, apply some power, apply more power, apply less power, charge batteries, stop charging batteries, etc. The controller 324 may not even require the ECM data in order to change its performance, but the ECM data could also be used to provide additional feedback. The power may be applied when the driver is accelerating or going uphill and then will be captured when the vehicle is slowing down or going downhill and assistance is not necessary. The cycle could repeat each time the sensory data identifies the road conditions and the truck conditions so the motors are enabled and disabled at the appropriate times.

The acceleration data of speeding up or slowing down is a foundational variable used to identify uphill or downhill movement and then from the battery levels can be charged and discharged accordingly, predicted terrain ahead, temperature of components, speed, etc. Capturing energy through the shocks is also a possibility. The axle can either spin the motor, which will create energy, or the motor can spin the axles, which will dissipate energy. So the electric motor can either act as a power source or a power generator that creates electrical power the batteries can store.

Energy may be created via movement of the truck or vehicle in more than one way. The energy is stored in batteries. When certain sensory conditions are within a predefined range (i.e. OBDII/ECM data is observed at threshold conditions, MPH, acceleration rate, braking, gyroscope movement, a particular gear being used, incline grade, engine noises, etc.), then the control system can engage the electrical energy which adds to the performance of the axle turning or to a suspension being shifted to increase efficiency. The energy (batteries/electric motor) will add to the performance of the axle being turned. Such information can be identified from the electronic control module (ECM), which is what truck vehicles use instead of an OBDII port. The 'energy' is from the suspension and from the axle itself which captures energy from movement. Electricity can be created from most forms of movement, however, in the examples disclosed energy is captured through the spinning of the axle.

Figure 4:
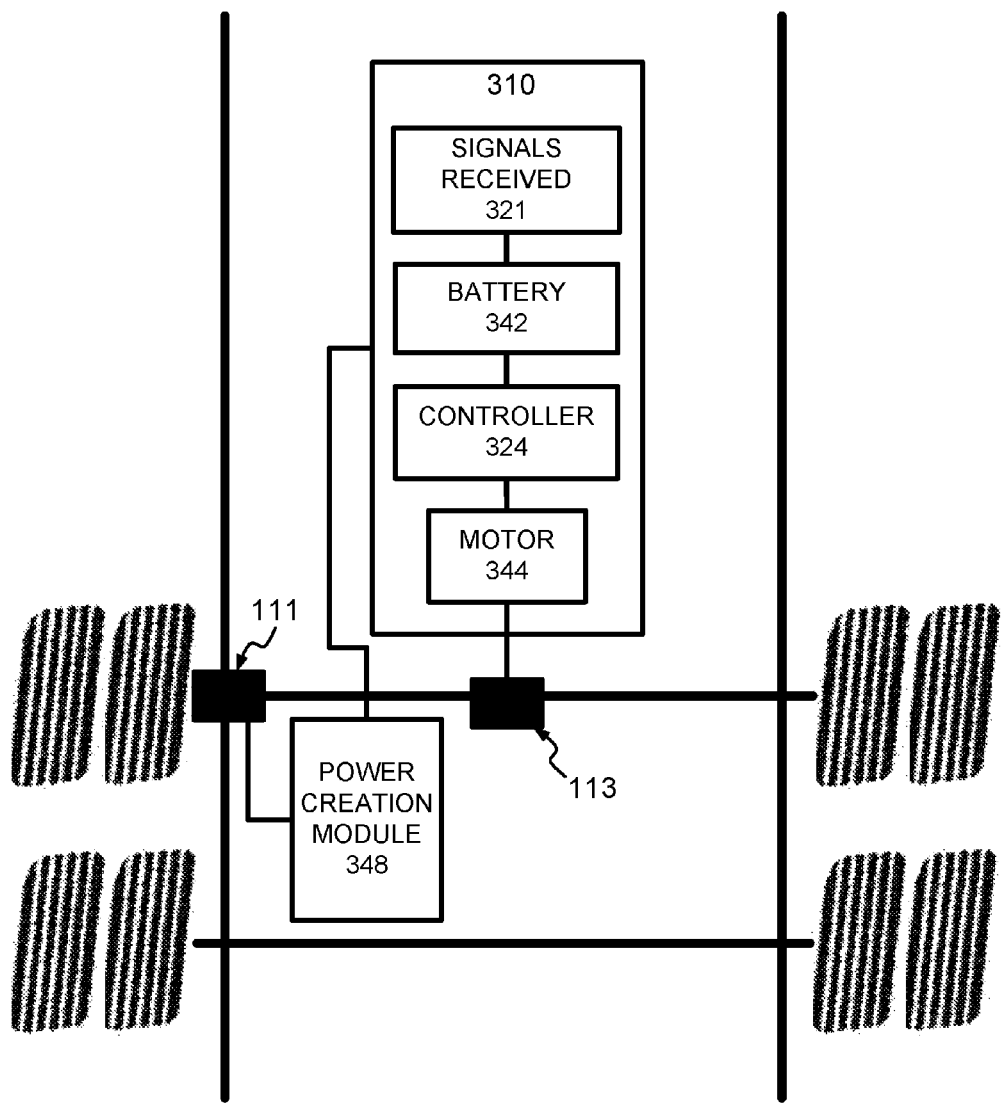
FIG. 4 illustrates a motor control and axle adaptation configuration according to example embodiments.

FIG. 4 illustrates a motor control and axle adaptation configuration according to example embodiments. Referring to FIG. 4, the motor and corresponding control system 400 may include a set of modules operating as a power and motor control unit 310. In this example configuration of FIG. 4, the power creation module 348 may be generating power while the motor 344 operates in a passive mode of operation. For example, when the motor is disabled via controller 324, the power creation module 348 may be enabled to generate power from the rotational movement of the axle, the shocks or from a separate energy charging configuration, such as solar panels and/or a charging unit (not shown). The sensory conditions detected via the various sensors may be received and processed via the signal reception unit 321. When a condition is determined to require additional energy, such as an incline grade experienced by the vehicle, a RPM threshold as detected by an audio sensor, a certain threshold MPH, etc., then the controller 324 may enable the battery to stop charging and to enable battery power to be dispersed to the motor 344 which enables accessory energy to be provided to the axle via an axle adaptation unit.

The control functions may include a microcontroller and/or processor which receive that sensor data and process the data to enable the motor to operate. The controller 324 may use logic to interpret the sensory data, compare the data to the predetermined conditions/thresholds and execute a power command decision. The OBDII or for trucks specifically, ECM digital data reading capabilities and interpretation from the controller 324 can be used to identify certain commands, such as, do nothing, apply some power, apply more power, apply less power, charge batteries, stop charging batteries, etc. In one example, the controller 324 does not require the ECM data in order to make a power distribution decision, however, the ECM data may also be used for motor enabling decisions.

The power may be applied when the driver is accelerating or traveling uphill and can be captured when the vehicle is slowing down or going downhill. In one example, acceleration, such as speeding-up or slowing-down is one approach to identifying when auxiliary power should be applied to the motors 344, also the terrain, such as uphill or downhill can offer data used to apply the auxiliary power. Additionally, battery levels, predicted terrain ahead (GPS, etc.), temperature of components, speed, etc., can all be applied to determine whether to apply auxiliary power and the degree of power needed. The axle can spin the motor, which will create energy, or the motor can spin the axles, which will dissipate energy. As a result, the electric motor can either act as a power source or a generator.

One example embodiment may include the power creation module 348 configured to generate electrical power, a battery 342 configured to store the electrical power, a motor affixed to an axle of the vehicle and configured to provide a turning force to the axle when enabled to operate from the stored electrical power of the battery. Also, the motor controller 324 is configured to initiate the motor 344 to operate based on a predefined sensor condition from any of the various sensors identifying the external conditions and providing the information to the controller for processing. In an alternative to just electric energy, fluid/gas compression energy may be captured and distributed to turn the vehicle axles. For example, by compressing fluid/gas when the vehicle is slowing down or stopped and the compressed fluid/gas can then be used to spin the axle when accelerating.

Examples of predefined sensor conditions may include a change in at least one of an accelerometer position, a global positioning system indicator, an acceleration status of the vehicle, and a velocity status of the vehicle. Other data about the vehicle may be identified from an inclinometer, a gyroscope, a microphone to listen to the trucks motor RPM to identify strain and overuse based on known audio conditions (i.e., engine noises), a strain and force sensor on or near the fifth wheel to measure the forces between the truck and trailer, auditing the truck electronic control system (ECM) to process the driver's actions and inactions, engine use, brake use, etc. When the motor is engaged to provide assistance directly at the axle, a fuel usage of the engine of the vehicle decreases. The electrical power is generated from at least one of a rotation of the axle, a movement of a suspension of the vehicle, and solar power via a solar panel affixed to the vehicle. Also, using the stored energy as a power source, for example, the driver can plug the truck into a power source to power heating/cooling electronics etc. The motor 344, batteries 342, or power supply 354 could also be used to power other items on the trailer such as an electric lift, fans, cooling system such as a refrigeration or heating system for a trailer, engine block heater, lift gate or other electrically powered components on a trailer, moving the trailer around in loading stations without requiring a hook-up of a diesel powered truck. Also, aerodynamics around the system including suspension adjustments, wheels, axles could be performed automatically to reduce drag and reduce fuel consumption.

In operation, the power creation module 348 may be a drive axle which is connected to the wheels so that power can be transferred from the wheels into the axle. The motor can then be directly mounted into drive axle. The motor may act as both the generator and the power source. The motor either applies positive, none, or negative torque at varying amounts. The axle may be a drive axle that was intended for a truck. As opposed to having a drive shaft, the motor is connected to the pinion, yoke and/or differential.

Figure 5:
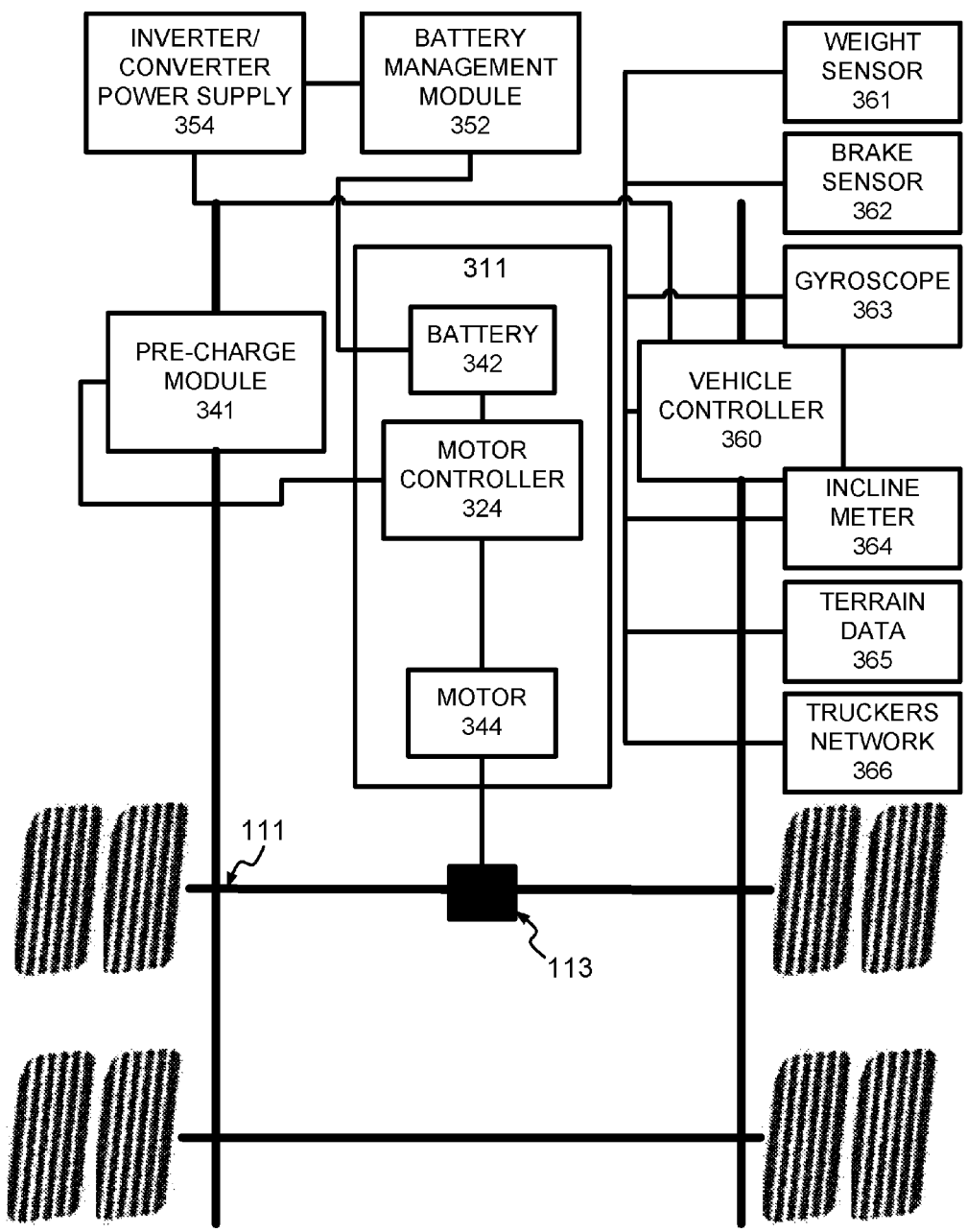
FIG. 5 illustrates a more detailed configuration of the motor control and axle adaptation configuration according to example embodiments.

FIG. 5 illustrates a more detailed configuration of the motor control and axle adaptation configuration according to example embodiments. Referring to FIG. 5, the system configuration 500 includes a main control unit 311 with the motor controller 324, a battery 342 and a motor 344. The pre-charge module 341 may enable the controller 324 to begin operating the motor 344. In this configuration, the vehicle controller 360 may represent a separate computing module which may be part of the motor controller 324 or a separate controller depending on the configuration adopted by the manufacturer. The vehicle controller 360 is responsible for identifying data received from any of the sensors and data sources including but not limited to a weight sensor 361 configured to monitor the weight of the truck, a brake sensor 362 configured to monitor when braking occurs, a gyroscope 363 configured to monitor position and movement of the vehicle in all directions, an incline meter 364 configured to monitor the relative incline of the vehicle, terrain data 365 configured to monitor and predict via stored maps, incline, and altitude data the current, past and/or future terrain of the road, a truckers network 366 configured to monitor data received from a wireless communication source regarding the local and extended conditions of the roads, a GPS sensor 367 to monitor vehicle location/speed/altitude/etc., and a wireless communication module 368 which can transfer data to the system and from the system through various communication sources such as cellular/satellite/etc. In the example of FIG. 5, the sensor information from a GPS, accelerometer, brake, etc., triggers the effort to launch a local motor action on the axles. The vehicle controller 360 receives the sensory data and processes the information to enable the motor's action. The data received is analyzed and compared to established thresholds, such as a known hills or terrain change, accelerometer data, GPS information, MPH, braking actions, and other speed related metrics. The information is received, processed, compared to thresholds, and a decision is made to engage the motor.

According to one example embodiment, an apparatus may include at least one sensor affixed to a vehicle configured to receive sensor data during movement of the vehicle, a motor affixed to an axle of the vehicle, where the motor configured to provide a turning force to the axle when enabled to operate from battery power. The apparatus also includes a processor configured to identify a threshold condition of the sensor has been triggered based on the received sensor data, and a motor controller configured to initiate the motor to operate based on the threshold condition. The sensor includes at least one of an accelerometer, a global positioning system unit, a vehicle brake detector, and a vehicle speed detector, an inclinometer, a gyroscope, a microphone, a sensor of the truck control system, ECM data, etc. The threshold condition may be a velocity of the vehicle, an angle of the vehicle or any threshold related to the sensor(s) data.

The motor controller enables the motor to begin operation when the threshold condition has been exceeded. The threshold condition includes a predefined angle of the vehicle while in motion. The threshold condition may also include a predefined miles per hour velocity when the vehicle is in motion. An inverter/converter power supply component 354 may convert the energy that is stored in the batteries 342 to energy that can be used by auxiliary power components, such as the truck while at rest areas, lift gates on the trailer, refrigeration or heating units on a trailer, the motor controller 324, the vehicle controller 360, in addition to other components on the system. The components of this configuration may include the electric motor 344, the motor controller 324, a logic controller or vehicle control unit 360 (VCU), batteries 342, the drive axle 111, a suspension frame and aerodynamics, as well as other subcomponents, such as the battery management system (BMS) 352, a 12V power supply (not shown), a DC-DC converter (not shown), a DC-AC converter (not shown), a cooling system (not shown), pre-charge circuit module 341, a drive connection 113, a weight sensor 361 and brake sensor 362.

The electric motor may be a 3-phase AC permanent magnet motor. However, those skilled in the art would appreciate that any electric motor could be used in the system configurations of the present application. This may include AC, DC, induction motors, etc. The electric motor communicates to the motor controller and has 3 electric phase lines (high voltage lines) connections in addition to smaller wires that send signals from the motor to the controller. The motor is also attached to a cooling system which flows an oil through the motor to dissipate heat in addition to lubricating the components. Cooling could range from flowing coolant through the motor, around the motor or using airflow to cool the motor or a combination of all cooling configurations.

The motor is then connected to drive axle in order to apply the torque to the wheels. A belt driven adaptation configuration with pulleys may be used. Or, alternatively, a direct drive configuration with the motor and axle being coupled can also be used. One configuration provides connecting into a present differential/pinion where the motor is spinning in a 90 degree fashion to the axle rotation. Another configuration may include the motor spinning in the same direction or in parallel to the axle and having a gearing system for adaptation.

The motor controller is the main linkage point between the motor and the batteries, which takes the energy from the batteries (DC current) and converts it into 3-phase AC current for the motor (or different configurations based on the motor selection type). The controller has the logic and hardware to send the energy in either direction. For instance, if performing regenerative braking, energy may be created at the motor, and then provided into the batteries for later use. The motor controller is the central hub between all of the components which takes its commands from the logic of the vehicle controller 360, which has its own internal logic to determine how to 'spin' the motor and how to recharge the batteries, which is also cooled via liquid, air, or a combination.

Data is collected through sensors analyzing data from the trucks control system/'CanBus' and how much torque to apply to the rear wheels and whether to apply power or recapture energy. This configuration is presently a printed circuit board (PCB type of a setup connected to sensors. The information is received from the motor, batteries, motor controller, and other subcomponents to make sure they are operating correctly. The main check may be a temperature of the components. If they are starting to overheat, the system may slow down or stop to permit cooling to occur prior to reinitializing the components. The logic of the vehicle controller will also transmit data through the cloud in order to supply customers with live data which allows us to perform software updates while the system is on the road.

The batteries may be lithium-ion batteries. Other energy storage solutions, such as a flywheel, compression, or other battery chemistries could be used. Cells that are linked in parallel and series to obtain the ideal voltage and charge/discharge rates can also be implemented. There are three levels to developing a battery pack. The first is the cells where the energy is actually stored. Then those cells are linked together to create a module such as 30 cells in a battery module. The modules are linked together to create the battery pack which may be four modules linked together. For example, a liquid cooled system with a chill plate underneath and around the modules can be used to remove heat, the fluid then circulates through a radiator for cooling. A non-conductive fluid could also be used which would allow for components to be fully submersed in this fluid. This fluid would then be circulated around the batteries 342/motor controller 324/inverter converter power supply 354/or other components for cooling. The fluid movement could be created by pumps, fans, gravity magnetic forces if the fluid is infused with magnetic material such as Ferro fluid, etc. Also, an electric powered chiller may be used cool the liquid before it passes over the batteries.

The drive axle permits the power to be transferred and placed to the wheels. Conventionally, the rear wheels on the back of a truck tractor trailer are passive. They are mounted onto an axle that doesn't rotate but the wheels spin around the outside hubs of the axle. In one example, the rear axles can be replaced with a drive axle, such as a drive axle from a truck. This axle is similar to a drive axle of a car where there is a differential and pinion. The electric motor spins the pinion which in return spins the wheels. A gearing ratio may be created within the differential so that the motor can spin at a different RPM than the wheels are. The motor and axle may also be in parallel or perpendicular, parallel would mean less energy loss.

The suspension frame may have an axle/suspension system such as a sliding tandem or bogie under trailers which is relatively uniform. This enables a truck driver to move the frame forward and backward underneath the trailer so the driver can optimize weight distribution across the truck and trailer axles. It also permits the location of the trailer to move to obtain tighter a turning radius when in a city. The sliding tandem is made up of a sliding box, a suspension system, such as air ride or leaf spring, and then the axles could be two axles or one or three or more axles. The axles could be fixed in one location or on a sliding/moving platform.

The entire suspension frame is also more aerodynamic than conventional configurations. By changing the way the air flows underneath the trailer and how it exits the back of the trailer, drag can be reduced which in effect reduces how much fuel is used. Conventionally, there is a significant amount of turbulent air that is gathered underneath the trailer. There is also a significant amount of back-drag that comes from how the air exits the back of the trailer. However, the configuration of the present application reduces drag and makes the system more fuel efficient.

In the battery management system (BMS) 352, the BMS identifies each cell's voltage, temperature, internal resistance etc., in addition to how much current is being pulled or pushed into the cells. By monitoring those variables, the cell life is maintained as long as possible. If the data identified from the BMS indicates the power is not optimal, the power of the system can be reduced or turned off as a whole. The BMS also has the ability to balance the cells. This permits each cell to stay at the same charge percentage throughout its life. For instance, if one cell was at 100% charge and another one is at 50% charge, you would not be able to charge the system anymore or else the first cell would be overcharged. The BMS is able to keep all cells at the same state of charge.

A 12 volt power supply, such as a 12 volt battery or DC-DC converter off of the main battery 342, may be used to power some of the components of the system including turning the motor controller on, powering the logic controller, powering the pumps, etc. A 12 volt power supply can be used to eliminate the 12 volt battery. The 12 volt source would come directly from a DC-DC converter, which takes the high voltage coming from the battery box and converting it into a lower voltage. This 12 volt source can also come from a 120 volt AC to 12 volt dc power supply. This 12 v source presently charges the battery but it may become the main 12 v power source. A 12 volt power source is presently used but other voltage levels such as 24 volt, etc. can be used.

The DC-AC converter permits us to take the present DC power from either the full battery pack or the 12 v battery and convert it into 110V AC power. This permits the driver to plug a truck into our system in order to power components in the truck. This would primarily be used for when drivers are sleeping in rest areas and they want a power source to power things such as their television, heating, cooling, electronics etc. It can also be used to power devices on the trailer such as a lift gate. The initial or a second DC-AC inverter may be used to power the trailer refrigeration or heating systems.

The cooling system may include two cooling systems. One is for the motor and the other is for the controller/batteries. These two systems could also be combined into one cooling system. The motor uses an oil-based liquid and the controller/batteries us a water/glycol based substance. The systems work by running fluid in or around components and dissipates the heat. The warm fluid is then circled through a radiator system in order to cool the heat. As mentioned above, alternate cooling methods such as a liquid chiller can also be used to dissipate the heat.

The pre-charge circuit module 341 uses fuses, relays, resistors and contractors in order to prevent a large voltage difference between components. An example of this is when the system first turns on, the motor controller is at zero volts. If power is surged to the controller, it has the possibility of damaging components. The pre-charge resistor gradually charges the motor controller to the full voltage before permitting a full open connection.

The drive connection/gearing uses a coupling between the motor shaft and the pinion in order to utilize the power transferring out of the motor. Also, a gearing ratio can be used so that the motor can spin at a different RPM than the axle. In the future, a gearbox can be incorporated into the system as well. This will permit us to have different torque levels at different RPMs. The weight sensor 361 senses the pressure within the suspension to determine how much load is in the trailer. The brake sensor 362 monitors the trailer brakes to determine whether they are engaged or not. From a safety standpoint, a driver attempting to slow down the vehicle does not need another motor attempting to turn the axles. In order to prevent safety failures, if the brakes are applied the motors cannot be engaged or will be engaged with regenerative braking. The system can also use regenerative braking at any time (for example on flat terrain) in order to recharge the battery 342.

The motors being engaged along with the regular truck engine usage may reduce how much fuel is being consumed by the diesel motor. Diesel motors are most efficient when they are used in a certain RPM range. When outside of this range, they become significantly less fuel efficient. When a truck is accelerating or it is traveling up a hill, there is a much larger load on the truck that the RPMs increase and thus the truck is no longer operating in its most efficient energy band. The motor control system of the disclosure may assist by providing the trailer with auxiliary energy when the truck is trying to accelerate or travel uphill. This permits the truck to stay in its optimal RPM range but also have more power. Other features include assisting when the truck is traveling downhill. Conventionally, a truck increases speed when going downhill and the driver has to use engine braking or apply actual brakes in order to slow the vehicle down. With the instant configuration, the electric motor can be used as a generator to slow the vehicle down and capture all that wasted energy and store the energy in a battery pack.

In addition to saving fuel through using hybrid electric technology, additional savings from aerodynamics and powering the truck while the driver sleeps may also save energy. The configuration may change the way the air flows underneath the trailer to reduce drag and make traveling more aerodynamic. The less drag there is means the less work the diesel motor has to do and the less fuel that will be consumed. Another aspect of fuel savings comes from using the battery pack as a power supply when a driver is sleeping or resting in the cab. Conventionally, drivers will leave their diesel motors running in order to power their heating/cooling and electronics. With the instant power system, they can leave their diesel motor off and power their devices off of our battery pack. Also, the present configuration is an overall technology solution for the trailer. By adding GPS tracking and data gathering mechanisms in order to make fleets smarter with how they utilize their trailers. All of this information is being transmitted to the cloud while the vehicle is on the road.

Example embodiments provide a propulsion device or system which replaces the convention rear passive axles underneath a tractor trailer with a configuration that applies positive and negative torque to the rear wheels. Tractor trailer suspension/axle systems are conventionally bolted to the frame of the trailer by eight bolts and have two air lines and an ABS wire. This suspension system can have one or more axles on it and is conventionally either an air ride or leaf spring suspension. This configuration utilizes the axle suspension configuration and adds a localized power source. This permits the wheels to either apply positive torque, coast or apply negative torque. When the system applies negative torque (i.e., using an electric motor as a generator) it is able to capture the energy and store it for later use (i.e., in a battery pack). The configuration can then use this stored energy for later use to apply positive torque to the wheels at the appropriate times. When power is applied, you may add an additional power source to the vehicle (i.e., it is no longer the truck's diesel engine pulling the entire load). The propulsion configuration assists in pushing the vehicle. The main effect of this configuration is reducing fuel consumption, which also acts as an auxiliary power unit (i.e. the driver can plug his truck into the battery and power the truck off by using the stored energy). The configuration is also more aerodynamic so it reduces drag which also saves on fuel.

The inventive aspects may also be applied to a wide range of other vehicles, including without limitation, motor vehicles such as cars, buses, construction equipment, motorcycles, motorized tricycles, mopeds and scooters, railed vehicles such as trains and trams, watercraft such as ships and boats (e.g., possibly linked to the propeller motion), aircraft such as planes and helicopters (e.g., tied to turbine/prop motion) and spacecraft, etc.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications thereto.

What is claimed is:

1. A trailer suitable for use in a tractor-trailer vehicle configuration in which a dominant motive force is supplied from a fuel consuming engine of the tractor, the trailer comprising:

one or more on-trailer motor-generators coupled to a respective one or more drive axles of the trailer to provide, in a first mode of operation, an assistive motive rotational force at wheels of the trailer and to provide, in a second mode of operation, a regenerative braking force at wheels of the trailer, the one or more on-trailer motor-generators responsive to a controller operatively coupled to one or more sensor inputs to transition between the first, the second and at least a third mode of operation based on direct determination by an inclinometer, during motion of the tractor-trailer vehicle over a roadway, of an uphill or downhill angle of inclination in a direction of travel over the roadway; and an on-trailer battery from which stored energy is supplied to power the one or more on-trailer motor-generators in the first mode of operation and to which regenerated braking energy is supplied in the second mode of operation.

2. The trailer of claim 1, wherein the controller includes an on-trailer motor controller portion that controls supply of energy from and to the one or more on-trailer motor-generators and a vehicle controller portion that interfaces with sensors and data sources including:

a geopositioning system configured to predict, for travel over the roadway along a route of predicted travel and based on then-current geopositioning and terrain information, future values of the uphill or downhill angle of inclination in the direction of travel over the roadway.

3. The trailer of claim 2,
wherein the vehicle controller portion is configured to manage charging and discharging of the on-trailer battery in accordance with terrain along the route of predicted travel.

4. The trailer of claim 2, wherein the vehicle controller portion interfaces with further sensors or data sources including one or more of:
an on-vehicle accelerometer;
an on-vehicle gyroscope; and
a braking status indication, a speed indication or electronic control module (ECM) data from the tractor.

5. The trailer of claim 2,
wherein, in the third mode of operation, neither motive rotational nor regenerative braking forces are applied to the one or more drive axles of the trailer using the one or more on-trailer motor-generators, but instead the tractor-trailer vehicle coasts or is motivated over the roadway solely by the fuel consuming engine of the tractor.

6. The trailer of claim 1, further comprising:
at least one additional motor-generator operatively coupled to the controller and coupled to at least another of the one or more drive axles to provide, in the first mode of operation, the assistive motive rotational force and to provide, in the second mode of operation, the regenerative braking force, wherein the controller further coordinates the motive rotational or regenerative braking forces applied to respective ones of the one or more drive axles.

7. A method comprising:
in a tractor-trailer vehicle configuration in which a dominant motive force is supplied from a fuel consuming engine of the tractor and wherein at least one drive axle of the tractor-trailer vehicle configuration is unpowered by the fuel consuming engine, providing, in a first mode of operation, an assistive motive rotational force at the drive axle using an electric motor-generator powered from a battery so as to reduce fuel consumption of the fuel consuming engine of the tractor in an uphill grade or during acceleration; and providing, in a second mode of operation, a regenerative braking force at the drive axle by capturing regenerative braking energy in a downhill grade or during braking using the electric motor-generator and storing the captured regenerative braking energy in the battery, wherein the electric motor-generator is responsive to a controller operatively coupled to one or more sensor inputs to transition between the first, the second and at least a third mode of operation based on direct determination by an inclinometer, during motion of the tractor-trailer vehicle over a roadway, of an uphill or downhill angle of inclination in a direction of travel over the roadway.

8. The method of claim 7,
wherein the battery and the at least one drive axle unpowered by the fuel consuming engine are both on-trailer.

9. The method of claim 7, further comprising either or both of:
estimating, for travel over the roadway along a route of predicted travel and based on terrain and then-current geopositioning information, the uphill or downhill angle of inclination; and
measuring the uphill or downhill angle of inclination during the motion of the tractor-trailer vehicle over the roadway.

10. The method of claim 7, further comprising:
managing charging and discharging of the battery in accordance with terrain along a route of predicted travel using a geopositioning system in connection with terrain information.

\* \* \* \* \*